July 23, 1968 D. N. SENZIG 3,394,354

MULTIPLE WORD RANDOM ACCESS MEMORY

Filed Nov. 30, 1965 10 Sheets-Sheet 1

INVENTOR.
DONALD N. SENZIG

BY

ATTORNEY

July 23, 1968 D. N. SENZIG 3,394,354

MULTIPLE WORD RANDOM ACCESS MEMORY

Filed Nov. 30, 1965 10 Sheets-Sheet 3

MULTIPLE WORD RANDOM ACCESS MEMORY

Filed Nov. 30, 1965 10 Sheets-Sheet 4

July 23, 1968 D. N. SENZIG 3,394,354

MULTIPLE WORD RANDOM ACCESS MEMORY

Filed Nov. 30, 1965 10 Sheets-Sheet 5

July 23, 1968 D. N. SENZIG 3,394,354

MULTIPLE WORD RANDOM ACCESS MEMORY

Filed Nov. 30, 1965 10 Sheets-Sheet 6

United States Patent Office 3,394,354
Patented July 23, 1968

3,394,354

MULTIPLE WORD RANDOM ACCESS MEMORY

Donald N. Senzig, San Jose, Calif., assignor to International Business Machines Corporation, Armonk, N.Y., a corporation of New York Filed Nov. 30, 1965, Ser. No. 510,497
14 Claims. (Cl. 340—172.5)

ABSTRACT OF THE DISCLOSURE

A memory configuration is disclosed wherein a plurality of words stored therein may be concurrently accessed. The memory includes special control features wherein a desired number of words beginning at a specific address may be accessed in either of two orthogonal directions. Assuming conventional word storage along the Z axis of a typical 3-D core memory, a plurality of such complete machine words may be concurrently accessed beginning at a given X-Y address in either the X or Y direction.

The present invention relates to a special memory configuration wherein a plurality of words may be concurrently accessed. More specifically, it relates to such a memory wherein a specified number of such words beginning at a specified location may be accessed in either of two orthogonal directions.

The computer industry is continually making efforts to increase the speed and thus the power of its machines. The present state of the technology in the computer industry is such that the majority of circuit devices as well as memory storage elements are reaching the speed at which the velocity of light becomes the primary factor in determining the ultimate speed of computation or information transfer within a given machine. It is thus apparent that the effective speed and power of machines must be increased by other means. The concept of multiprocessors is currently being widely explored in the computer industry as a means of increasing the effective speed of a machine wherein a multiplicity of operations is performed simultaneously. It is, of course, apparent that the use of such machines requires the obtaining of the necessary operands simultaneously in order that they may be supplied to the respective arithmetic units in a substantially concurrent fashion. It is, of course, possible to utilize a plurality of separate memories with such a system, each said memory being separately addressable to fetch requested operands. However, it is apparent that with such a system the overall machine, in essence, comprises a plurality of separate computers each having separate memory units and arithmetic units merely connected into one large central control unit. A memory organization of this general type is disclosed in copending U.S. application Ser. No. 468,437, filed June 30, 1965, of D.N. Senzig wherein means are provided for separately addressing a plurality of memory units to obtain a plurality of operands. In this system the degree of simultaneity is dependent upon the manner in which the addresses are generated insofar as the amount of logical circuitry which is committed to the generation of simultaneous addresses is inversely proportional to time required to generate the addresses.

It has now been discovered that a plurality of words may be accessed from a memory simultaneously by organizing the memory such that it is composed of a plurality of rectangular storage planes wherein each plane stores single bits of words stored in a direction perpendicular to said individual planes. The memory may further be provided with controls to read out a predetermined number of words in either the horizontal or vertical direction beginning at a specified address in said direction.

It is accordingly a primary object of the present invention to provide a memory particularly adapted for use with a multiprocessor computing system capable of simultaneous mupltiple word access.

It is a further object to provide such a memory capable of such multiple accesses in either the X or Y directions.

It is a still further object to provide such a memory wherein a variable number of words may be accessed upon command.

It is yet another object to provide a memory wherein the first address of a predetermined word group may be specified.

It is another object to provide such a memory wherein the overall three dimensional (3-D) memory is organized as a plurality of memory planes wherein one bit of a memory word is stored in each plane.

It is yet another object to provide such a memory wherein each plane has individual horizontal (X) and vertical (Y) sense lines which may be selected in accordance with a given access instruction.

The foregoing and other objects, features and advantages of the invention will be apparent from the following more particular description of preferred embodiments of the invention, as illustrated in the accompanying drawings.

Figure 1:
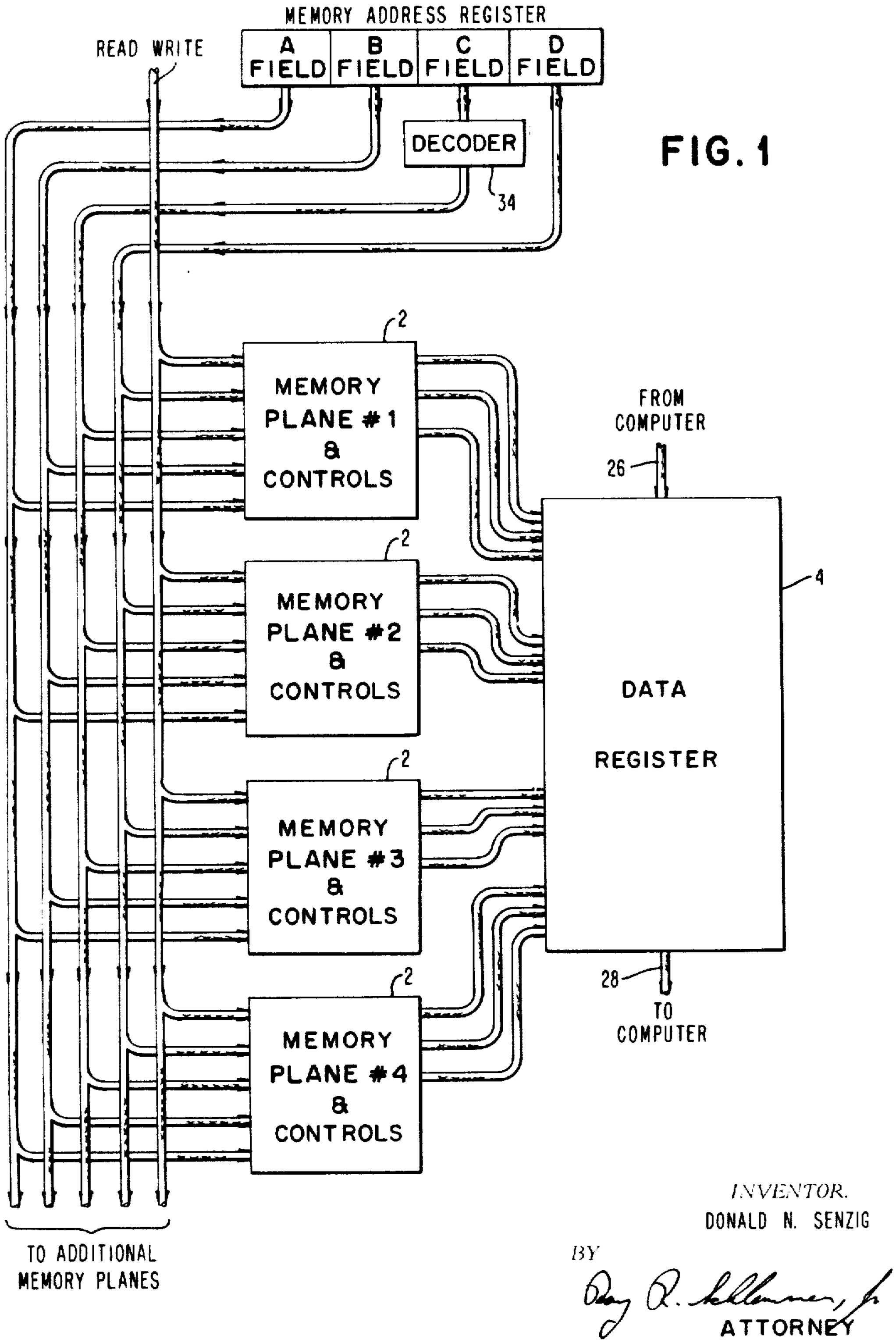
FIG. 1 is a functional block diagram of the overall memory system.
Figures 2, 2A:
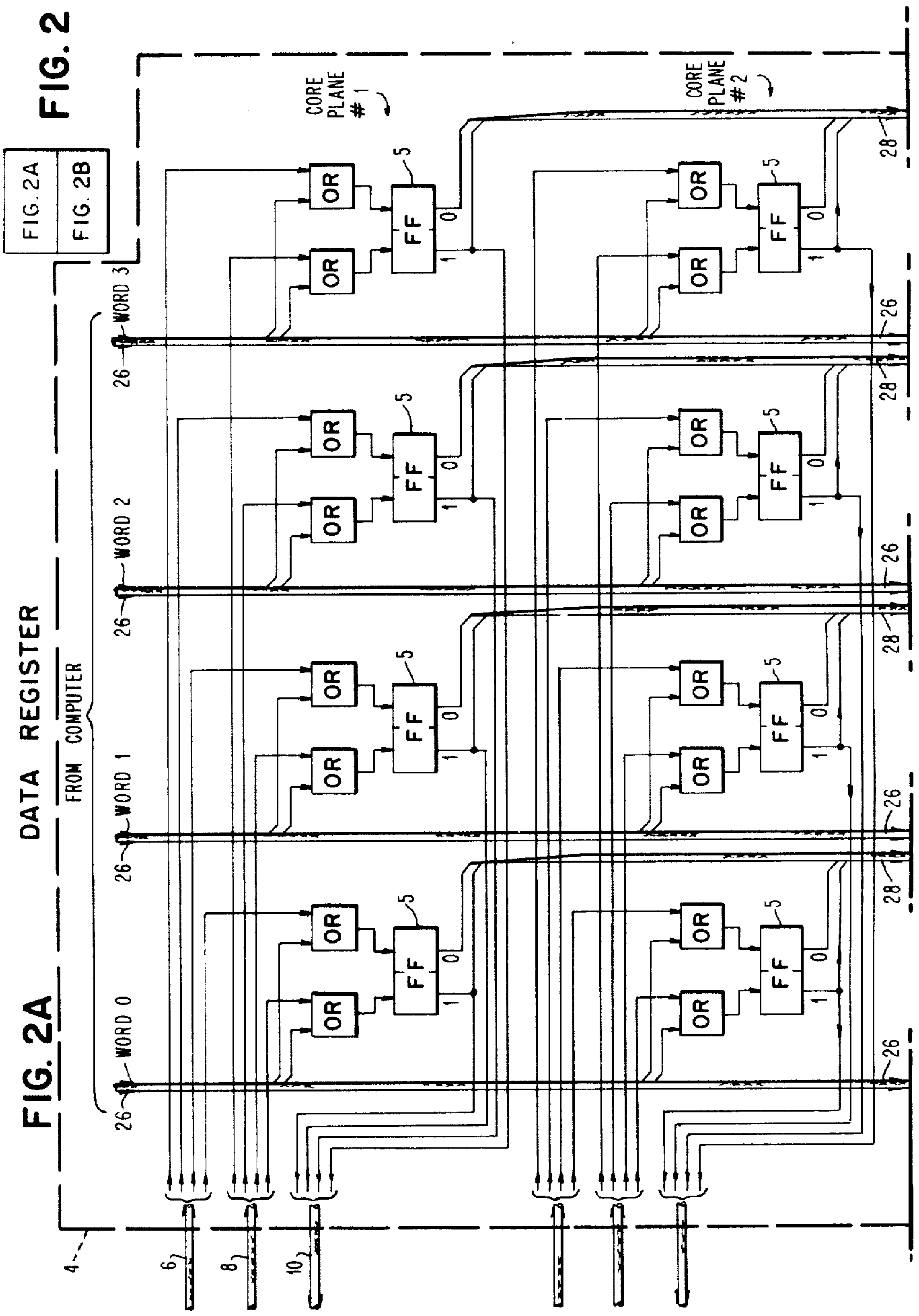
FIG. 2 is an organizational drawing indicating the relationship of FIGS. 2A and 2B.
Figure 2B:
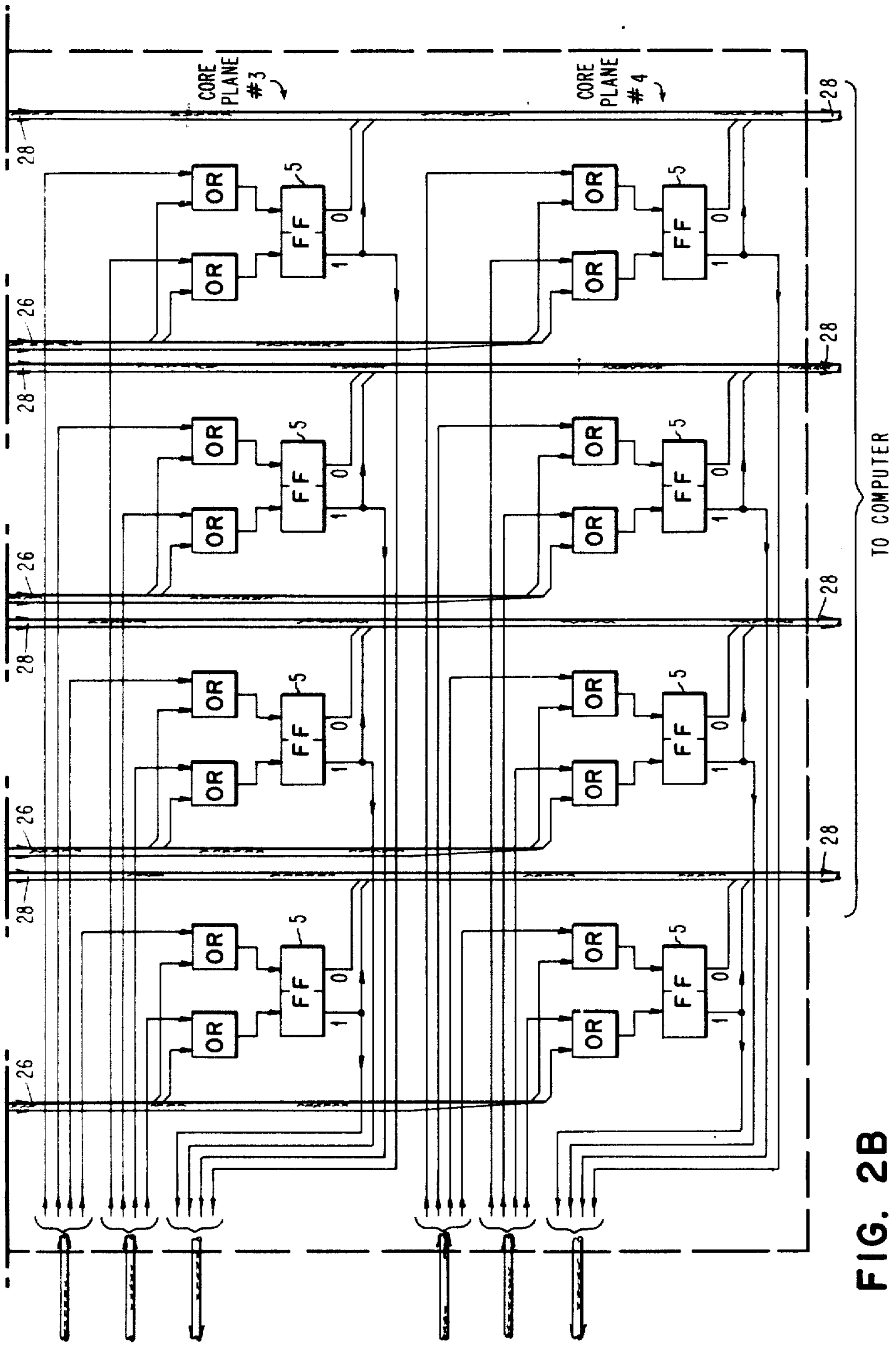

FIGS. 2A and 2B constitute a logical schematic diagram of the Data Register shown in FIG. 1.

Figures 3, 3A:
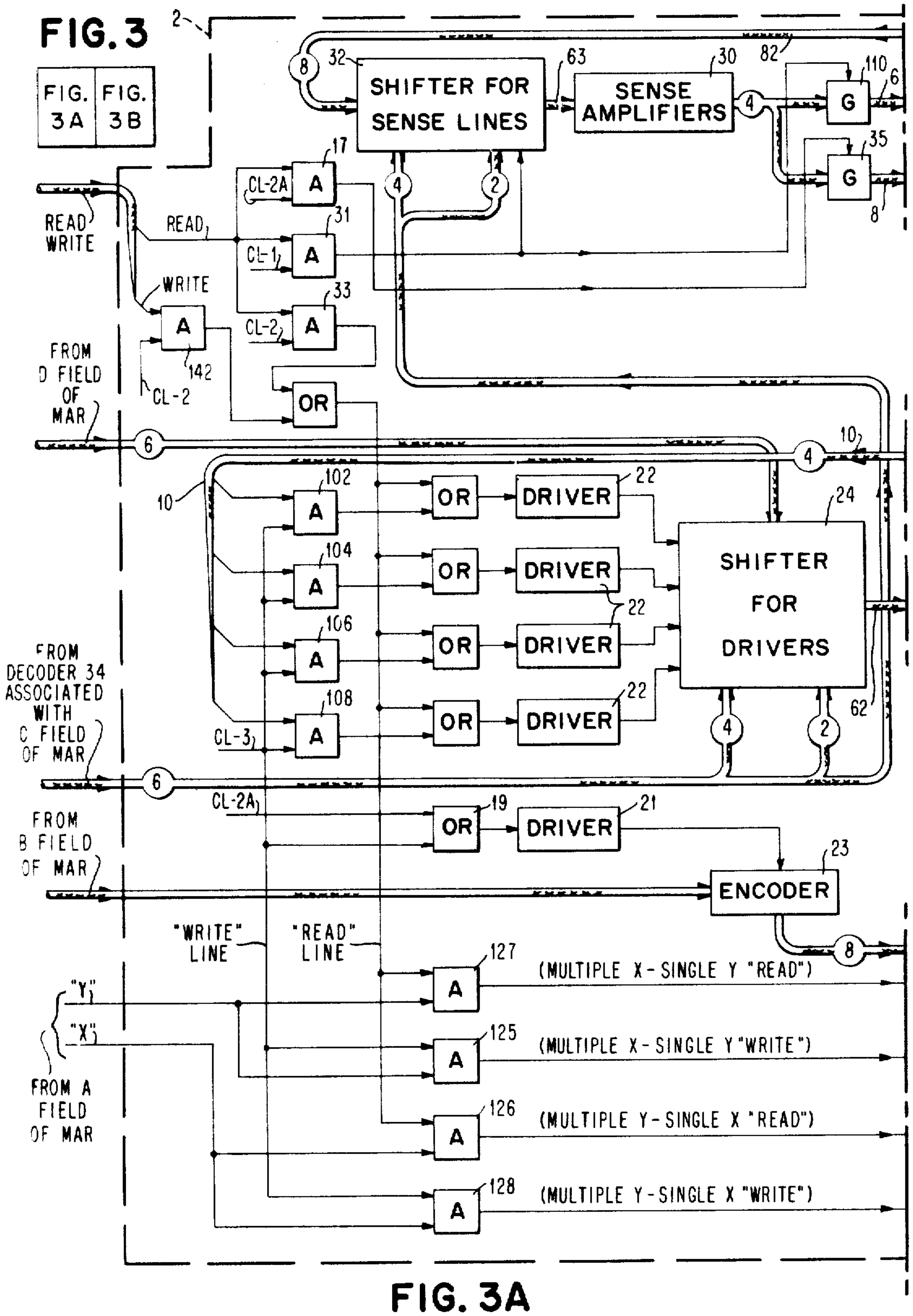
Figure 3B:
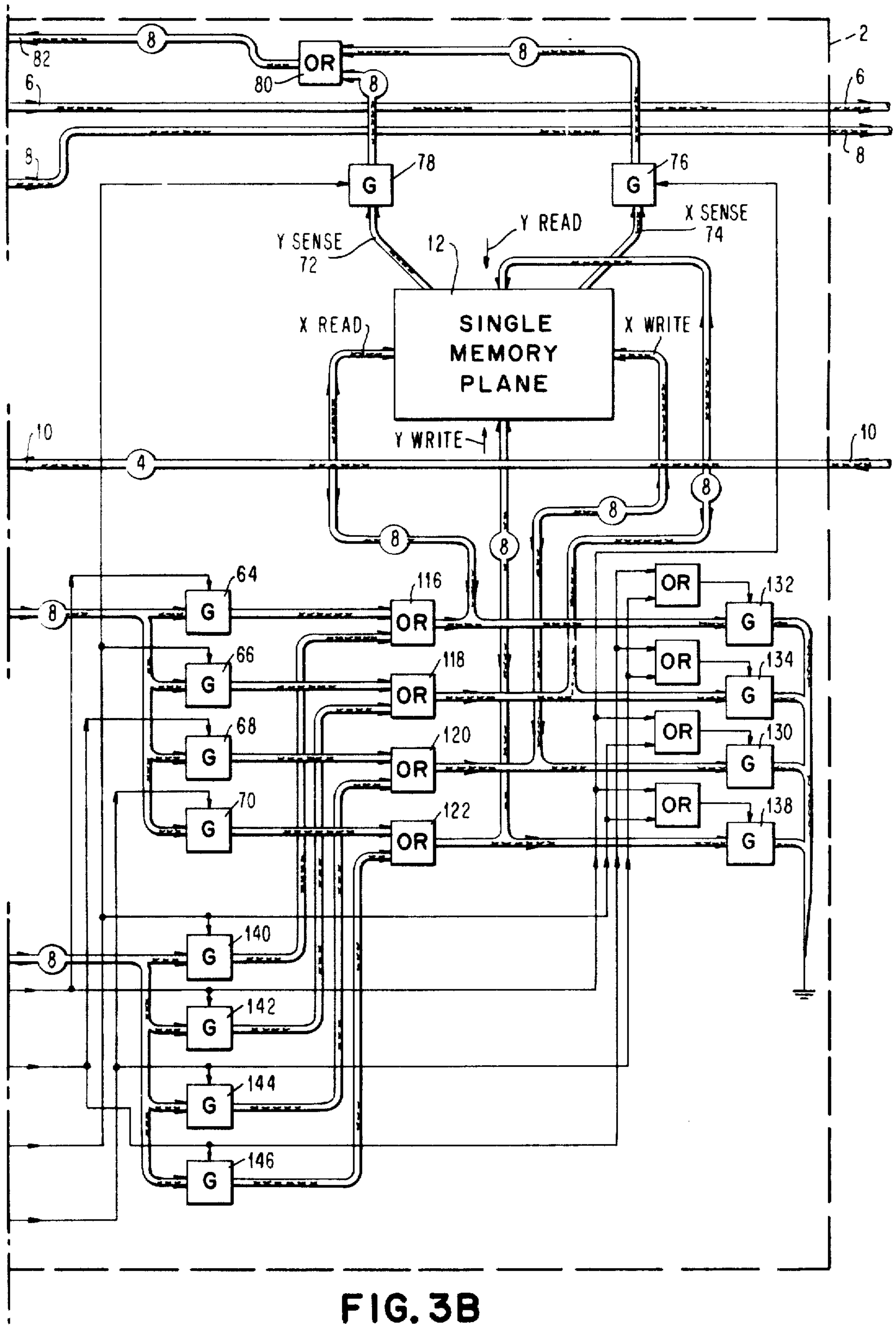

FIG. 3 is an organizational drawing illustrating the relationship of FIGS. 3A and 3B.

FIGS. 3A and 3B constitute a partial logical schematic and partial functional block diagram of the individual Memory Plane and Controls shown in FIG. 1.

Figure 4:
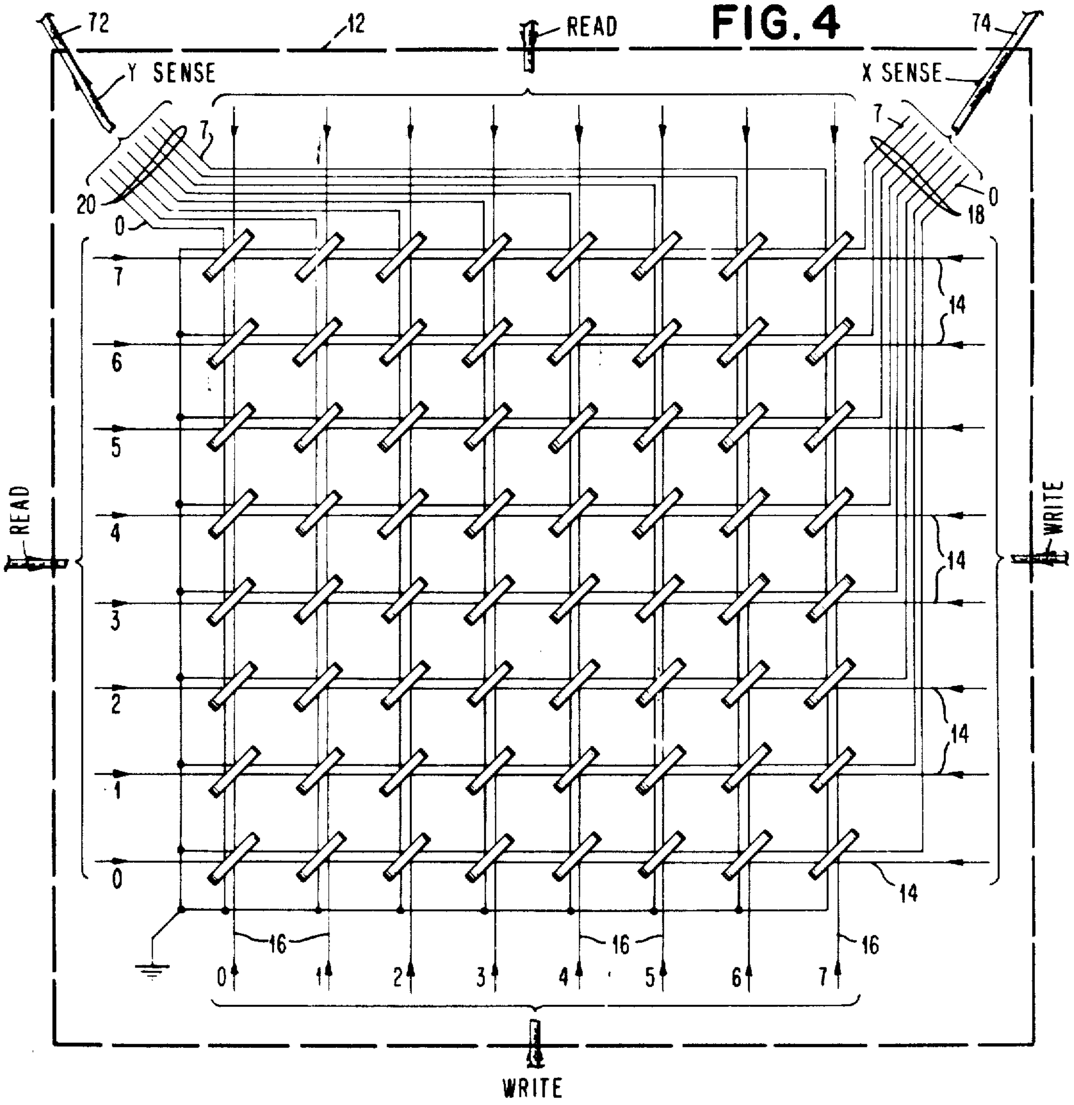

FIG. 4 is a detailed wiring diagram of a Single Memory Plane as shown in FIG. 3B.

Figures 5, 5A:
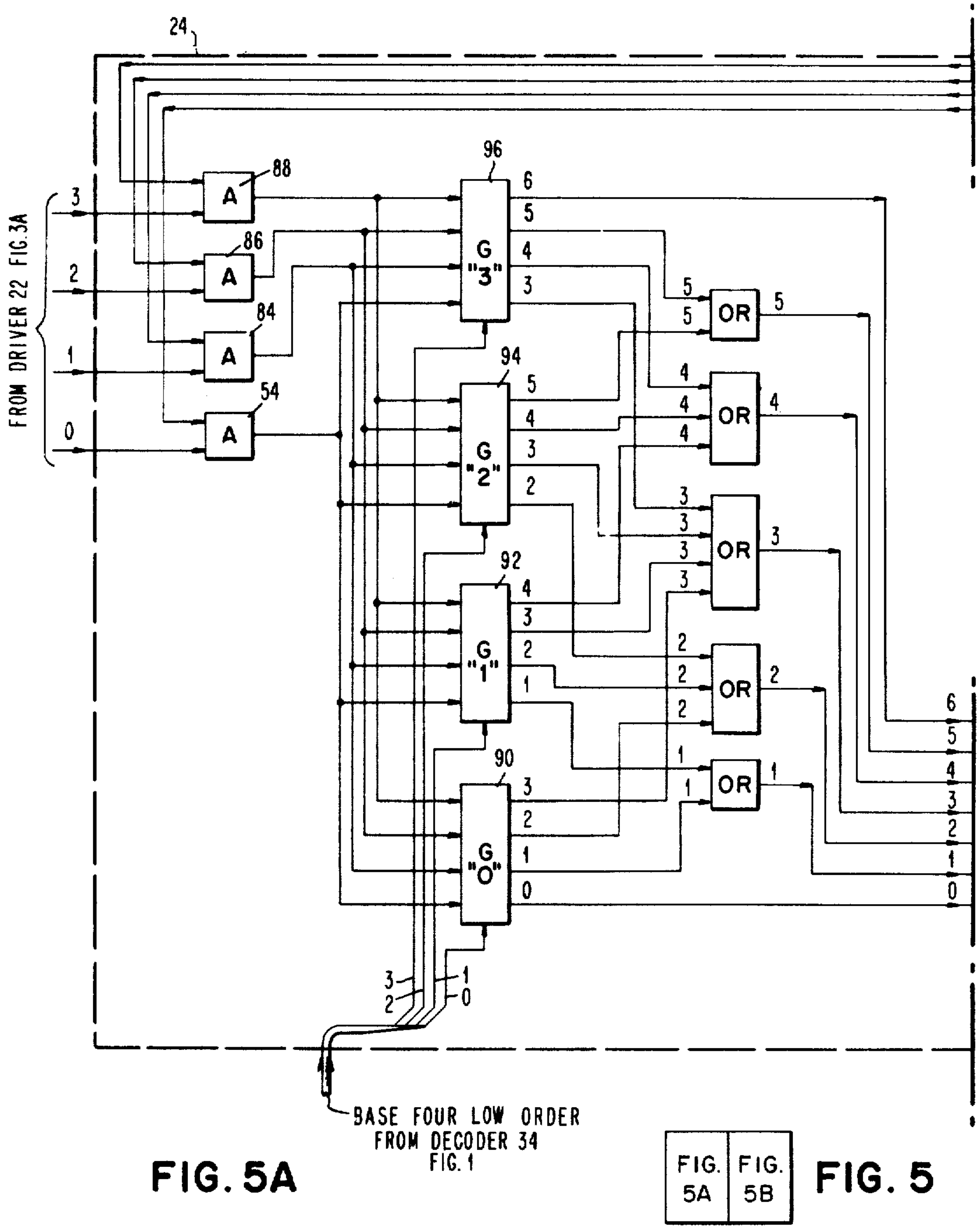
Figure 5B:
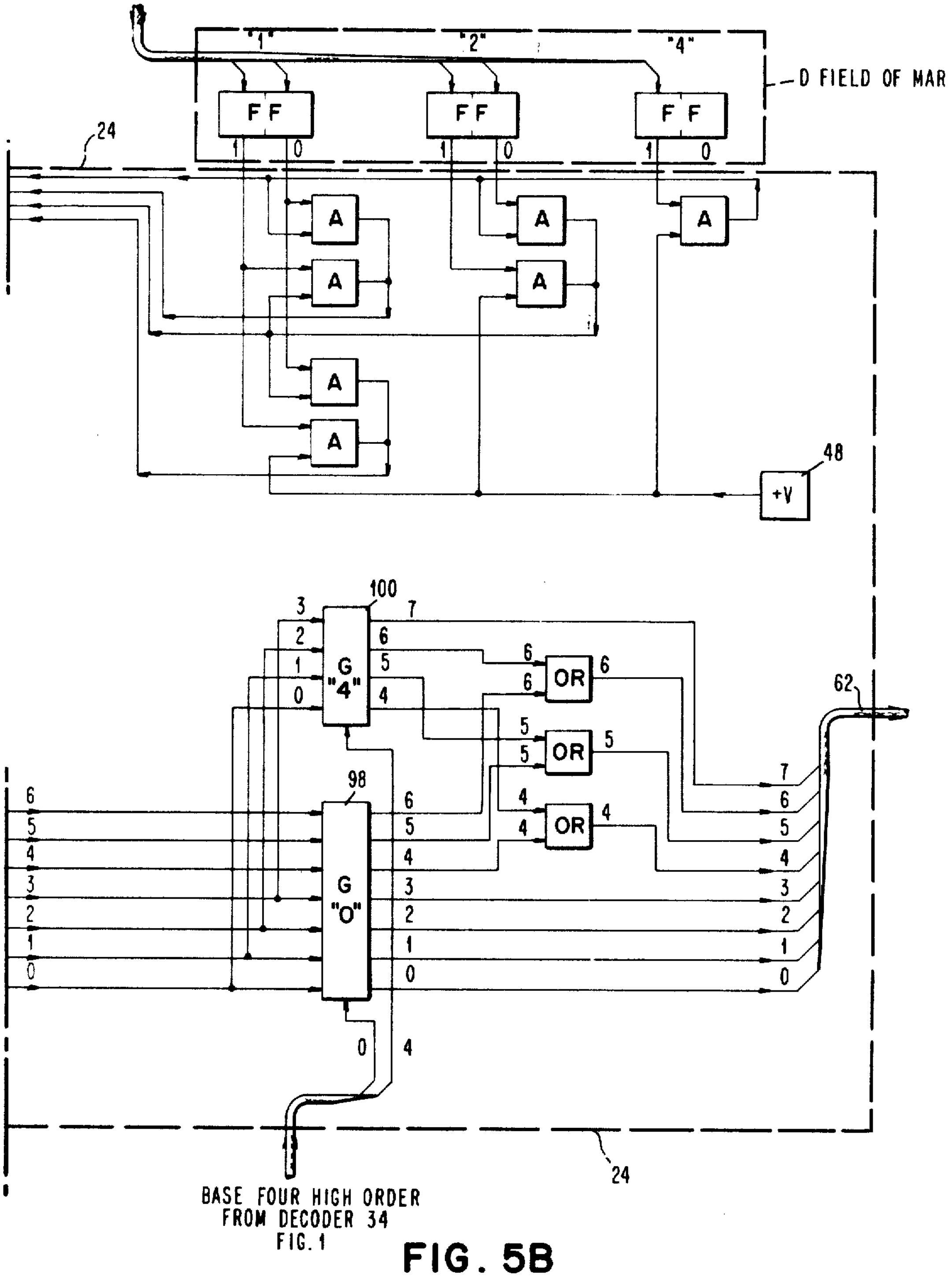

FIG. 5 is an organizational drawing illustrating the relationship of FIGS. 5A and 5B.

FIGS. 5A and 5B constitute a logical schematic diagram of the Shifter for Drivers shown on FIG. 3A.

Figures 6, 6A:
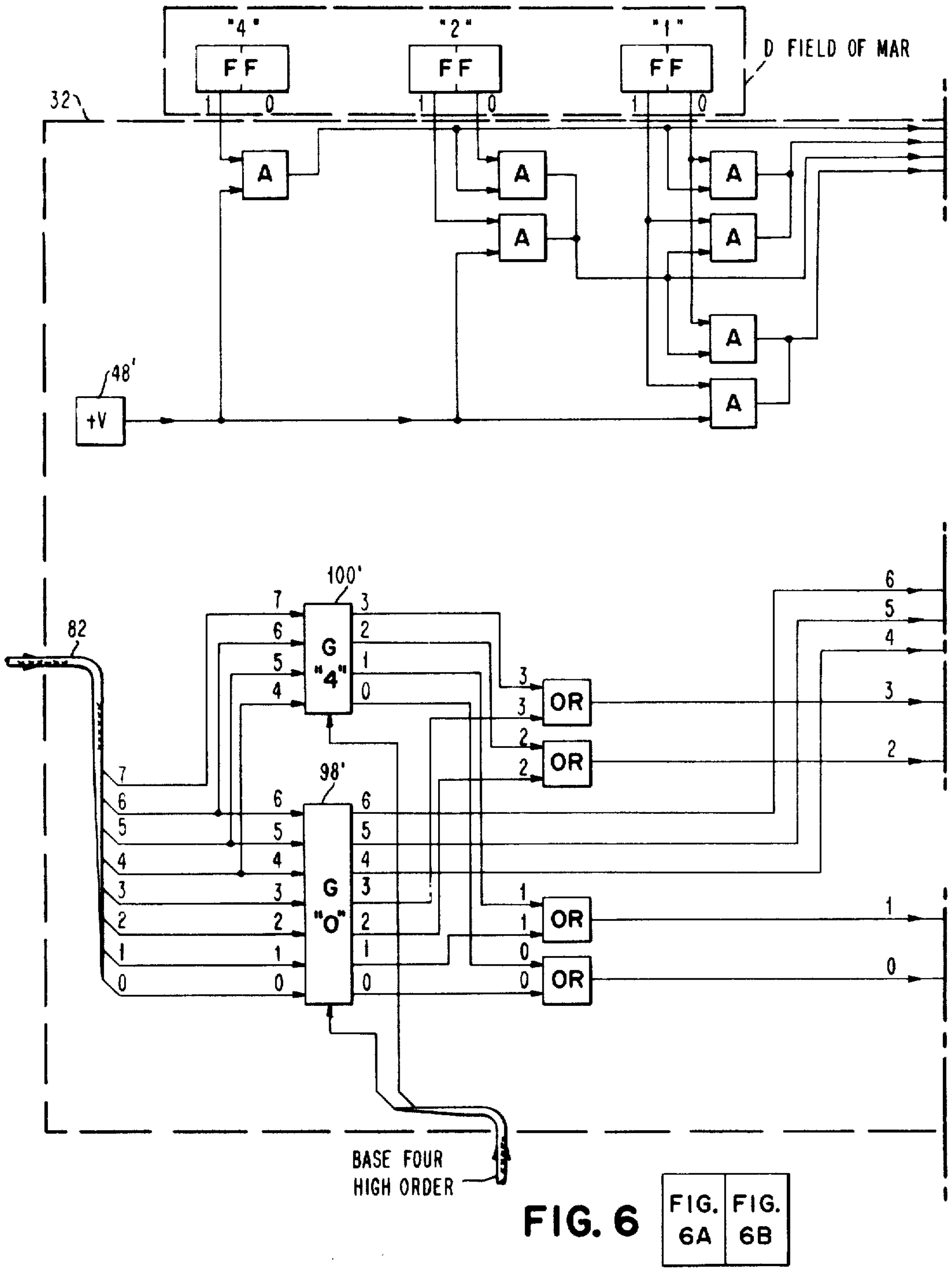
Figure 6B:
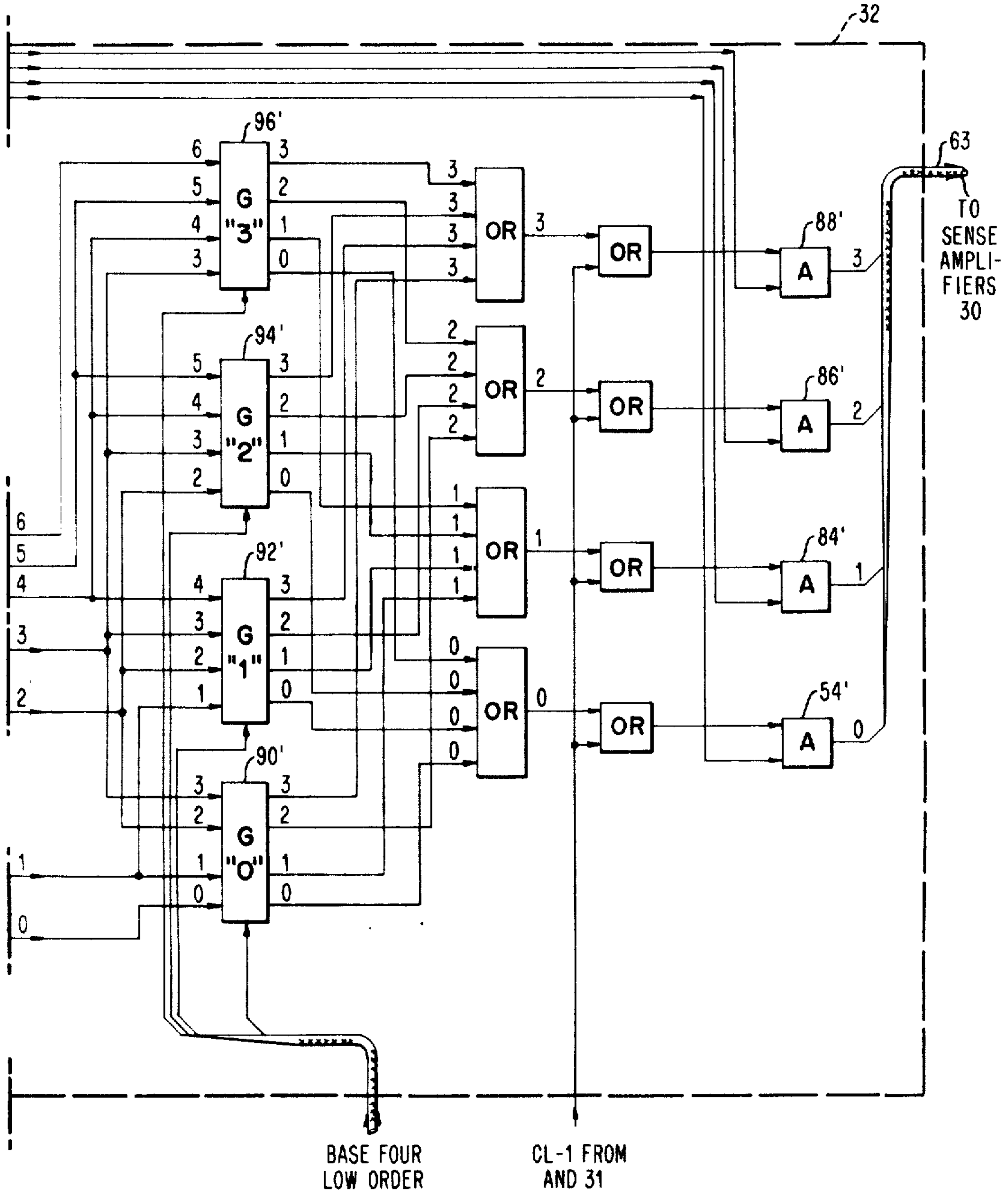

FIG. 6 is an organizational drawing showing the relationship of FIGS. 6A and 6B.

FIGS. 6A and 6B constitute a logical schematic diagram of the Shifter for Sense Lines shown on FIG. 3A.

Figure 7:
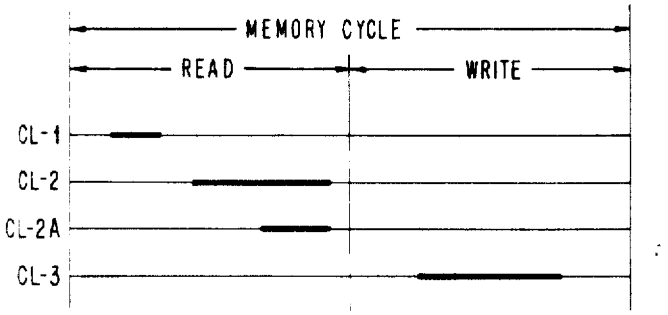

FIG. 7 is a timing chart for the disclosed memory system.

The objects of the present invention are accomplished in general by a three dimensional simultaneous multiple word access memory wherein said memory is composed of a plurality of two dimensional storage planes, each said plane having means associated therewith for energizing a plurality of bit drive lines selectively along a first coordinate direction. Each two dimensional memory plane further includes controls for energizing a single drive line along a second coordinate within each such plane to effect multiple bit accessing of said plane. Also included are means for selectively routing data from the appropriate memory sense lines to a Data Register provided for said memory.

A Memory Address Register and Decoders therefore are also provided to interpret a memory request which specifies the direction of the access, i.e., X (horizontal) or Y (vertical), specifies which X or Y line the access is to lie along, specifies the first address along said line at which the access is to start and finally, specifies the number of storage positions or words to be accessed beginning with said first address. A typical format for a memory access instruction suitable for use with the presently disclosed system will be set forth subsequently in the specification. Thus, the system is capable of accessing a plurality of words in either the X or Y direction of the memory. This multiword access may begin at any specified address along such axis and further, may select a single word or any specified number of words up to the maximum number of fetches of which the particular system embodiment is capable.

As will be appreciated from the above general description of the system, it is possible to access multiple words of memory concurrently for either reading or writing cycles. This type of operation is extremely desirable in multiprocessor computing organizations wherein it is desired to perform a large number of operations simultaneously whether or not they be the same type of operation, i.e., addition, multiplication, division, etc., and to return the results to memory in as short a period of time as possible. While this type of memory is especially suitable for use with matrix or vector arithmetic wherein the same arithmetic operation is being performed in all cases, the use of such a memory organization is not limited thereto. It will, of course, be understood that it is necessary for the user, i.e., the programmer, to be completely familiar with the organization of data storage within the memory so that the simultaneous access capabilities may be used to best advantage. It will accordingly be assumed that the particular storage designations within the memory and the manner in which data is to be accessed is completely within the control of the programmer, as it actually is, and no attempt will be made to illustrate particular problems wherein specific consecutive addresses would be desired as this is within the province of the mathematician or programmer using the machine.

Having thus generally described the overall operating features and advantages of the present system, the system will now be specificially described with references to the accompanying drawings. It will, of course, be understood that the present embodiment is simplified for purposes of description and that an actual operating embodiment would include many features such as post-write disturb circuitry, parity checking circuitry, etc., which are well known to persons skilled in the art and a description of the details of which would contribute nothing to the present invention.

The present embodiment utilizes a simplified or scaled down memory having four 8 x 8 bit core storage planes while in reality up to 128 x 128 bits would typically be used. Similarly, only four core planes are specifically disclosed while 72 or more planes would more typically be utilized since 72 bit words are more usual in the larger computer memory than 4 bit words. It should be understood that all the principles set forth in the present embodiment would apply equally well to a system embodying more cores per plane and also more planes per memory, i.e., bits per word. In order to accommodate such larger planes, larger decoders and, of course, instruction words have more bit positions would have to be used.

Table I which follows illustrates a typical address format which would be supplied to the system Memory Address Register. As indicated in the legend below the instruction word, the data content of the four fields is shown. The number of bit positions in each field are all that is required for the 8 x 8 core plane of the disclosed embodiment. However, as indicated above, if larger planes were to be used, obviously more bit positions in the fields B, C and D would be required to properly identify the desired access.

TABLE I

| 1 bit | 3 bits | 3 bits | 3 bits |
|---|---|---|---|
| A field | B field | C field | D field |

Memory Address Word Format:
A = Direction of access X or Y.
B = If the access is in the X (Y) direction, B gives the number of the X (Y) line.
C = If the access is in the X (Y) direction, C gives the first of the Y (X) lines.
D = Gives the number of Y (X) lines, i.e., number of accesses.

As indicated in the above table, the A field indicates whether the direction of access is to be in the X or the Y direction. For purposes of explaining this embodiment, a binary 1 in the A field indicates the access is in the Y direction and, conversely, a binary 0 would indicate an access in the X direction. The content of the B, C and D fields is set forth in the above Table I, however, this will be more clearly understood by referring to the following tables. Table II illustrates an 8 x 8 core plane wherein the x's indicate the four bit positions which it is desired to access. Referring specifically to the table, it will be noted that these four consecutive bits lie in the Y direction, are on the "2" Y line, begin with the "2" X line and the access continues for four consecutive bits.

TABLE II

Y Lines

| X Lines | 0 | 1 | 2 | 3 | 4 | 5 | 6 | 7 |
|---|---|---|---|---|---|---|---|---|
| 0 | | | | | | | | |
| 1 | | | | | | | | |
| 2 | | | x | | | | | |
| 3 | | | x | | | | | |
| 4 | | | x | | | | | |
| 5 | | | x | | | | | |
| 6 | | | | | | | | |
| 7 | | | | | | | | |

Referring now to Table III below, the necessary contents of the four fields are illustrated in this table wherein the eighth field sets forth the Y direction. The B field indicates that the value for Y equals the decimal 2. The C field indicates that the X value or address is decimal 2 and that the D field contains a value of decimal 4.

TABLE III

| | | | |
|---|---|---|---|
| 1 | 2 | 2 | 4 |

A field; Y direction.
B field; Y=2.
C field; X=2.
D field; 4 (number of accesses).

Referring now to Table IV, the binary contents of the MAR word are shown which content is actually supplied to the system Memory Address Register. It will be noted that the A field contains a single binary 1 which indicates that the access is to be in the Y direction. The B and C fields contain the binary combination 010 which as is well known signifies a decimal digit of 2. The D field contains the binary combination 100 which specifies a decimal digit of 4.

TABLE IV

| | | | |
|---|---|---|---|
| 1 | 010 | 010 | 100 |

The presently disclosed system is capable of receiving such an address and energizing the appropriate bit drive lines within each core plane to read out the specified bit positions within said core plane and route same to a Memory Data Register over appropriate sense lines from which register the information may be routed elsewhere in the computer system, read back into the memory in the same or in altered form or read back into a different area of memory depending upon the system command.

The invention will now be described more specifically with reference to the accompanying drawings. FIG. 1 is a functional block diagram of the disclosed embodiment of the system wherein the three major functional units are labeled. The first of these is the Memory Address Register having the four fields A, B, C, and D therein. As is well known in computer systems, this Memory Address Register would be loaded from the overall computer instruction program as for any normal computer memory operation. The blocks entitled Memory Plane and Controls include a single core storage plane and the various selection and driving circuitry for energizing and selecting the drive lines and for selecting the proper sense lines from the output of each core plane for the proper routing of data to and from the Data Register 4.

The Data Register is a relatively conventional binary storage register and is illustrated in FIG. 2. This register is capable of storing the bits accessed from each core plane and, in essence, reorganizes the bits from these 2–D core planes into memory words which may then be routed to the computer. Thus, as will be apparent from the more particular description of the operation of the system referring to FIGS. 2 through 7, information is brought into the Data Register in what might be termed the horizontal direction, that is, individual bit information from the 2–D core planes. Data is routed to and from the external computer to the Data Register in the vertical direction. The logical circuitry shown in FIGS. 3, 4, 5, and 6 are all included in the blocks labeled Memory Plane and Controls as will be apparent from the subsequent description.

FIG. 2 is a detailed logical schematic diagram of the Data Register 4 shown in FIG. 1 as indicated above. Individual flip-flops 5 are utilized as the actual storage organs as is well known in the art and by suitably pulsing the "1" or the "0" side of said flip-flops, they may be set according to the input provided. Similarly, the setting of the flip-flop may be interrogated by merely making a connection to the appropriate "1" or "0" ouput sides of said flip-flops as is well known in the art. It will be noted that the legends in FIG. 2 indicate that the horizontal rows are associated with the various core planes and the vertical columns comprise the word organization of said Data Register and thus the memory. Thus, up to four bits may be accessed simultaneously from the core planes and stored in the horizontal rows of said Data Register. As was stated above, only four horizontal bits and four vertical bits, i.e., one per core plane, are disclosed in the present embodiment although it will be readily understood that many more bits and words could be provided for in such a system by a skilled practitioner in the part.

The cables 26 are input cables from the computer and are utilized to set the storage organs 5 of the Data Register from an external source such as the computer magnetic tape, etc. The cables 28 are utilized to transfer data out of the data Register to the computer or external storage. It will be noted that the cables 26 and 28 enter the Data Register in the vertical or word organization mode. Referring now to the upper left hand corner of the figure, the cables designated 6, 8, and 10 are utilized to transfer bits into and out of the Data Register from the individual core planes. It is these lines which actually connect the Data Register with the individual planes of the memory. It will be noted that these cables are organized to come into the Data Register in the horizontal or contiguous bit organization mode. Cable 6 is used to reset the flip-flops 5 to "0," cable 8 is utilized to set the flip-flops 5 to "1" when appropriate and cable 10 is utilized for the purpose of transmitting data from the Data Register back into the individual core planes on a "write" cycle.

FIG. 3, comprising FIGS. 3A and 3B, comprises a combination logical and functional schematic diagram of the controls for the individual 2–D core planes 2. It should be noted that the Single Memory Plane box 12, Shifter for Drivers 24, and Shifter for Sense Lines 32 are shown in detail in FIGS. 4, 5, and 6 respectively. Referring now specifically to FIG. 3, it will be noted that five drivers are shown, four feeding into the Shifter for Drivers and a single driver 21 feeding into the Encoder 23. These drivers are well known in the art and provide the necessary drive pulses to the Memory Plane for providing half-select pulses on up to five lines. As will be remembered from the previous description, one pulse is provided through the Encoder 23 and is transmitted along a single sense line in the direction of access. Four drive pulses are concurrently supplied along the opposite coordinate sense lines to provide full-select pulses to up to four storage locations in the Memory Plane. Thus, a half-select pulse will appear on only one of the eight lines from the Encoder which will go through one of the gate circuits shown connected in the output line and thence into an appropriate X or Y drive line depending on the specified direction of the access and also upon whether or not a "read" or a "write" operation is being called for. Simultaneously, up to four of the eight lines emanating from the Shifter for Drivers 24 will be active which will pass through one of the four gate circuits shown connected to its output and thence into the Single Memory Plane on one of the four designated drive line inputs thereto again depending upon whether an X or Y access is being specified and upon whether a "read" or "write" operation is specified. The four gate circuits 132, 134, 130, 138 shown below the Single Memory Plane on FIG. 3B connecting the respective eight line cables to ground are for the purpose of completing the drive circuit for a particular memory access operation. Thus, if a drive pulse comes in on the X "write" line, the gate circuit connecting the X "read" line is activated to ground the other end of the line and thus completes the drive path. The same operation applies to all four of the input lines to the Single Memory Plane in any given operation as will be described subsequently in a description of an operation of the system.

The Shifter for Drivers 24 performs the function of directing the drive currents from the drivers shown feeding into the Shifter to the proper drive lines going into the memory. The Shifter responds to inputs from the D field of the MAR and the C field of the MAR. These fields specify first address along a particular coordinate of the memory wherein a memory access is to be started and the D field specifies the number of acceeses beginning with said first access. Thus, as in the example shown in Table II, the first address which would appear in the C field is the address $X=2$. However, it will be understood that the only thing the Shifter sees is the actual binary representation of 2 which is a 010. The number 4 appears in the D field of the example which means that the next four X lines beginning with the address 2 must be actuated. Thus, the output of the Shifter would have drive pulses appearing on lines 2, 3, 4, and 5. This is assuming that the number 4 appeared in the D field of the MAR. If, for example, the number 2 appeared in this field, only two lines would be brought up, i.e., lines 2 and 3. The specific description of the operation of the Shifter for Drivers will be more clearly described in the general description of FIG. 5 and also the description of the overall system operation subsequently.

The Shifter for Sense Lines 32 performs exactly the same operation as the Shifter for Drivers except that it, in essence, reverses the selection operation. By this is meant that the Shifter for Drivers 24 receives up to four pulses from the Drivers 22 and shifts or directs these four input pulses to a selected number of eight possible output lines. Conversely, the Shifter for Sense Lines 32 has up to four pulses entering same on eight lines at its input side and by means of the switching network, selects the four energized lines and properly directs them to the four output lines from the output of the Shifter 32 where they are subsequently passed through the Sense Amplifiers 30 and thence into the Data Register 4.

Finally, referring to the lower part of FIG. 3A, it will be noted that a cable brings in the contents of the A field of the MAR. As will be remembered, this was a single bit position capable of storing a binary "1" or "0" designating a Y or X access direction respectively. The input from these two lines is appropriately fed to the AND circuits 125, 126, 127, 128 whose output is applied to the twelve gate circuits shown on the lower half of FIG. 3B to gate the drive signals from the Shifter 24 and from the Encoder 23 to the appropriate core plane drive lines as was described previously.

Thus, the components of the system shown on FIG. 3 perform the primary selection and switching functions of the present system to decode the data supplied to the system Memory Address Register and control the individual Core Plane Drivers 21 (1) and 22 (4) to access the memory in the manner specified by the system instruction.

FIG. 4 is a detailed drawing showing a single core plane which would be appropriate for use with the present system. As described previously, it shows an 8 x 8 core matrix utilizing well known magnetic toroids capable of bistable operation as the storage elements. The drive lines and sense lines are labeled in the drawing, it being noted that all of the sense lines are brought out to a common ground as there is no directional significance to the current in these windings as there is in the X and Y drive lines. It will be noted that both the X and Y drive lines are indicated as having a "read" input and a "write" input, this as will be understood, relates to the direction of the driving signal which will pass through these lines. Thus, on a "read" cycle, current will pass through in one way and attempt to switch all of the cores being interrogated back to their "0" state while in the "write" mode of operation the current would pass through these windings in the opposite direction to set the storage core to its "1" state. Due to the configuration of the present system, it is not necessary to use inhibit lines since on a "write" signal half-select pulses are only supplied to those cores which it is desired to set to a "1" unlike a conventional 3–D memory organization where the drive circuitry attempts to set all cores of the memory word to a "1" but where pulses on the inhibit winding prohibits the setting in certain core positions as is well known. As stated previously, directionality is no problem with the sense windings, therefore, both the X and Y sense windings are connected together to a common ground.

FIG. 5 is a logical schematic diagram of the Shifter for Drivers 24 shown on FIG. 3. As indicated before, this unit receives information from the C field and D field of the system MAR. Based on this input, the Shifter 24 selects the proper number of drive pulses to be passed through the shifting network and gates these pulses onto the proper drive lines to be passed into the core plane for accessing the memory.

Referring now to FIG. 5, the three flip-flops at the top of FIG. 5B receive the input from the D field of the MAR and as will be noted, these flip-flops are denoted as a "1," "2," and "4" which, as will be understood, designates the binary weight of this position in the address field. Thus, if it were desired to access two consecutive bit locations in the core planes, the "2" flip-flop would be set to a binary "1." Referring to FIG. 5, in examining the logic circuit appearing below the "2" flip-flop, it will be readily apparent that the AND circuits 54 and 84 would be energized by a binary bit combination of 010 in the three indicated flip-flops. The output from these two AND circuits result in drive pulses appearing at the lower inputs of the gate circuits 90, 92, 94, and 96. The four ouputs from the AND circuits 54, 84, 86, and 88 are then shifted and distributed over the eight lines of the cable 62 by the shifting network comprising the gate circuits 90, 92, 94, 96, 98, and 100. These gate circuits comprise a base 4 shifter as is well known in the art and depend upon the energized lines from the Decoder 34 on FIG. 1 for input. It should further be noted that only two gate circuits, 98 and 100, are shown in the "base 4 high order" side of the shifting network on FIG. 5B since 8 is the highest number that must be represented in the shifting network since there are only eight lines in either the X or Y direction illustrated in the Memory Plane. If more lines had been used in the Memory Plane, two additional gate circuits would have been necessary in this stage. The functions of the OR circuits appearing immediately to the right of both pairs of gate circuits is obvious and now will be explained specifically.

Thus, for example, if the address 5 appeared in the C field of the Memory Address Register, the gate circuits 92 and 100 would be energized by the output of the Decoder 34. By following the lower two output lines from gate circuit 92 marked numeral 1 and numeral 2, the input lines marked numeral 1 and numeral 2 to gate circuit 100 would be energized, thus, energizing the output lines labeled 5 and 6 from the output of gate circuit 100. Thus, the drive lines labeled 5 and 6 of cable 62 are energized by this Shifter which are the two desired drive lines specified by the aforementioned example of two consecutive bits which appeared in the D filed of the MAR and the address of 5 specified in the C field of the MAR. Depending now upon whether an X or Y access direction had been specified, the number 5 and number 6 drive line into the Single Memory Plane 12 would be energized by the output of the Shifter.

The Shifter for Sense Lines 32 of FIG. 6 as stated previously performs substantially the identical function of the Shifter for Drivers 24 just described with reference to FIG. 5. All of the reference numerals on FIG. 6 are succeeded by a prime (′) to relate them to the equivalent circuits on FIG. 5 for clarity. The function which this circuitry must perform is to direct the proper signals appearing on the sense input lines in cable 82 to the proper lines in cable 63 which are then transferred to the Sense Amplifiers 30 for amplification and storage in the Data Register 4. Assuming as in the previous example that the numeral "2" flip-flop of the D field of the MAR were energized, a single input would be received in the AND circuits 54′ and 84′. Concurrently therewith the number 5 appearing in the C field of the MAR would result in the gate circuits 100′ and 92′ being energized. Thus, following the circuitry through, an input appearing on input lines 5 and 6 to gate circuit 100′ would appear on the output lines 1 and 2 from this gate. These signals enter gate circuit 92′ on lines 1 and 2 and exit on lines 0 and 1 which provide the second inputs to the AND circuits 54′ and 84′ respectively. Thus, the lines labeled 0 and 1 on cable 63 will be energized and pass through the Sense Amplifiers to appropriately set the corresponding 0 and 1 bit positions of the Data Register 4 for the appropriate core plane.

FIG. 7 is a timing chart for the present system wherein it will be noted that clock pulse CL–1 initiates operation of the system on a "read" cycle followed by clock pulse CL–2, clock pulse CL–2*a*, and clock pulse CL–3. These timing pulses as will be well understood may be provided by any suitable timing network such as a series of three flip-flops connected together by suitable delay circuits and pulse forming circuits to provide the desired duration and spacing of these pulses. As will be understood, the appropriate address must be stored in the system Memory Address Register before a memory cycle is initiated. Referring to FIG. 3, it will be noted that clock pulse CL–1 is applied to the AND circuit 31 and serves to clear the appropriate storage stages of the Data Register 4 through the Sense Amplifier 30 over cable 6. Clock pulse CL–2 provides input to the Drivers 22 and also enables the cable 8 through AND circuit 33 and gate 35 so that when the "read" pulse is applied to the Single Memory Plane the output from the Single Memory Plane may be transmitted from the Shifter for Sense Lines 32 to the Data Register 4. The shifting circuitry in both the Shifter for Drivers 24 and the Shifter for Sense Lines 32 is automatically set by the contents of the C field and D field of the Memory Address Registers. Thus, clock pulse CL–2 causes the contents of the selected bit positions of the Single Memory Plane to be stored in the appropriate bit positions of the Data Register 4.

It should also be noted that clock pulse CL–2 is utilized to energize the top two AND circuits 125 and 127 shown at the bottom of FIG. 3A. The output of these AND circuits is applied to the eight gate circuits shown on FIG. 3B including gate circuits 64, 66, 68, and 70 which causes the drive pulses from the Shifter for Drivers to be properly supplied to the X and Y "read" line rather than the "write" line.

Clock pulse CL–2*a* is supplied to OR circuit 19 to energize the single line Driver 21. As will be noted this pulse is delayed in its initiation from CL–2 but is otherwise concurrent. The initial transient signal induced by the multiple half select drive pulses in the sense lines is allowed to abate before the second half select pulse on the single line from Driver 21 is applied. Similarly CL–2*a* is applied to AND circuit 17 together with the "read" signal and thence to gate 35 to prevent said initial transients to die down before the outputs from the Sense Amplifiers 30 are gated to the Data Register 4. This timing is necessary due to the fact that the sense lines parallel the drive lines through the width of a core plane and the magnitude of the indirect pulse is quite large.

Clock pulse CL–3 causes the writing of the contents of the Data Register back into memory. To accomplish this the clock pulse CL–3 is applied to the four AND circuits 102, 104, 106, and 108 where it is ANDed with the contents of cable 10 from the Data Register. Accordingly, each input line on cable 10 containing a "1" causes an appropriate output from the AND circuits 102, 104, 106, and 108 to enable the appropriate Drivers 22 and also the Driver 21 as will be understood. Clock pulse CL–3 is also applied to the appropriate AND gates 125 and 128 to energize the X and Y "write" cables entering the Single Memory Plane 12. As will be remembered from the previous description, the "write" and "read" drive lines are actually the same lines, however, when a "read" operation is occurring, the drive current will pass through the memory in one direction and when a "write" operation is being performed, the drive current will pass through in the opposite direction. As will be understood by those skilled in the art since the present memory is a conventional destructive readout core memory, every "read" instruction must include a "write" portion to restore the information from the Data Register back into the memory. For a "write" operation the "write" line is ANDed with CL–2 rather than the "read" line which resets the cores selected to "0"s as is well known.

Thus, the present system is provided with an address and a "read" or "write" signal and data is read out of the individual Memory Planes or stored in said planes under the completely flexible control of the input controls. Although the individual Memory Planes are operated in a two dimensional fashion, the system appears as an overall three dimensional memory due to the manner in which access is provided to the Data Registers and also to the manner in which the individual Memory Plane Controls operate in parallel from the single Memory Address Register.

The following description of the overall system describing a typical system operation is provided to further link together the various portions of the system as represented on the various drawings in a single description. Although the individual operation of the various segments of the system as represented in the drawings has been fully and clearly set forth previously, it is believed that the subsequent overall description should further aid in an understanding of the present invention.

The following description of the operation of the system will utilize the example set forth in Table III previously in the specification. This information appeared in the MAR in Table IV which is reproduced below.

TABLE IV

| | | | |
|---|---|---|---|
| 1 | 010 | 010 | 100 |

From the above table and the previous description, it will be remembered that this instruction word indicates that an access is to occur in the Y direction on the particular line $Y=2$. The first X line to be energized is 2 and four consecutive words are to be accessed, that is, along the X lines 2, 3, 4, and 5. This instruction word is stored in the Memory Address Register shown on FIG. 1 which register is available to the control circuitry set forth in the other figures. In the subsequent description only the controls going into a Single Memory Plane will be described. However, it should be remembered that the same data is transferred from each of the Single Memory Planes as exemplified on FIG. 3 and this data transferred into the respective horizontal rows of storage flip-flops of the data Register on FIG. 2. It will be assumed that this operation is the "read" operation which requires a subsequent "write" operation at the termination of the "read" portion of the cycle.

The first occurrence in the system is clock pulse CL–1 which is applied to AND circuit 31 together with the "read" line input. The output from this AND circuit is applied to the four AND circuits 54′, 84′, 86′, and 88′ on FIG. 6. Concurrently, four additional input pulses are received from the D field of the MAR into the same AND circuits since the binary number 4 is stored therein to energize all four of the lines in cable 63 which are applied to the Sense Amplifiers 30 on FIG. 3. The output of the Sense Amplifiers passes through the gate circuit 110 on FIG. 3 and passes over cable 6 to reset all four of the storage flip-flops 5 on FIG. 2 to a "0."

Next, clock pulse CL–2 is ANDed with the "read" line bringing up the output from AND circuit 33 on FIG. 3. The output of AND circuit 33 is applied to the appropriate OR circuits to all four of the Drivers 22. The occurrence of CL–2*a* energizes AND circuit 17 shortly after the initiation of clock pulse CL–2. The output from AND circuit 17 is applied to the gate circuit 35 to enable the output from the Sense Amplifiers 30 to be directed over cable 8 into the Data Register when said gate circuit is energized. Referring now to FIG. 5, all four of the AND circuits 54, 84, 86, and 88 will be enabled from the pulses appearing at the output of the four Drivers 22 and from the occurrence of the number 4 appearing in the D field of the MAR. The occurrence of a numeral 2 in the C field of the MAR causes the output of the Decoder 34 to energize gate circuits 92 and 98 (still on FIG. 5) thus, shifting the four output pulses from the Drivers 22 to the lines 2, 3, 4, and 5 on cable 62. The contents of the B field of the MAR causes the number 2 line in the output from the Encoder 23 to be energized upon the occurrence of clock pulse CL–2*a*. Returning now again to the output of the AND circuit 33, this pulse is also applied to AND circuit 127 which receives a second input from the Y line from the A field of the MAR shown in the lower portion of FIG. 3A. The output of the AND circuit 127 performs four functions. It energizes the gate circuits 64 and 130 which enables the four drive lines and passes them into the X "read" side of the Single Memory Plane out through the opposite side of the memory and thence through the gate circuit 130 to ground. Concurrently, gate circuits 142 and 138 are energized which allows the single Y "read" line to be energized and ground same through the gate circuit 138. Thus, half-select pulses are applied to the four X drive lines (2, 3, 4, and 5) to the single Y line (2) thus causing the four storage locations in the memory at the intersection of the single Y drive line and four X drive lines to be read out. The outputs from these storage locations are read out along the X sense lines 74 through gate circuit 76 which is also enabled by the output of the AND circuit 127. These pulses are then transmitted through the OR circuit 80 into the Shifter for Sense Lines 32 wherein the appropriate shifting is accomplished as exampled previously so that the four bits distributed across the X sense lines, 2, 3, 4, and 5, are shifted to appear consecutively along the four output lines on the cable 63 as was explained previously. The pulses appearing on these lines are appropriately amplified in the Sense Amplifiers 30 and transmitted through the gate circuit 35 which is enabled by the combination of the "read" signal and clock pulse CL–2*a* so that the information on the four lines may be stored in the appropriate stages of the Data Register. Having completed this operation, the "read" cycle, in essence, is completed.

The initiation of clock pulse CL–3 begins the "write" cycle of the memory. As stated previously, this cycle is included whether a "read" cycle precedes it or not. In other words, after a normal "read" cycle it is necessary to reread the contents of the Data Register back into memory to retain said data as is well known in the art or conversely, if it is desired to read data in from external storage, this data is initially stored in the Data Register 4 and a "write" instruction given to the memory. In this eventuality neither CL–1 nor CL–2 will have any effect because the "read" line will not be up.

Proceeding now with the "write" portion of the "read" operation, the clock pulse CL–3 is ANDed with the contents of the Data Register coming in over cable 10 on FIG. 3 to the AND circuits 102, 104, 106, and 108. It will be noted that the four lines of the cable 10 are connected to the "1" sides of the flip-flops 5 on FIG. 2. Thus, only those Drivers 22 will be energized having an associated "1" in the flip-flops 5 of the Data Register 4. Clock pulse CL–3 is also applied to the single line Driver 21 as well as the AND circuits 125 and 128 which set up the driver line gates in the memory.

Assuming the example above, it will be understood that what now must be accomplished is a multiple X-single Y "write" cycle. Thus, the AND circuit 125 will be energized by the combination of the CL–3 pulse and the occurrence of the Y access line. The output from AND circuit 125 is applied to the gate circuit 68 to gate the appropriate drive lines into the X "write" input to the Single Memory Plane and concurrently, the gate circuit 132 to ground the opposite ends of said drive lines as was explained previously. The control of the Shifter for Drivers 24 is exactly the same as for the "read" cycle, the same input from the system Memory Address Register being used to control the gate circuits within said Shifter. At this point it should be remembered that since this is a "write" operation, it is not necessary to energize the sense circuitry. The output from AND circuit 125 is also applied to the gate circuit 146 to energize the Y "write" input from the single active line from the Encoder 23. Gate circuit 134 is also energized by the output from AND circuit 125 to appropriately ground the opposite end of the Y drive line. The Encoder 23 is likewise set as before from the B field of the system MAR. Thus, with the occurrence of clock pulse CL–3, "write" pulses are applied over the appropriate X and Y drive lines and to the Single Memory Plane to write "1's" into those positions of the Single Memory Plane corresponding to the flip-flops 5 of the Data Register 4 also containing "1's". It should be noted that the clock pulse CL–2 is ANDed in AND circuit 142 with a "write" signal which is effective to reset the selected storage positions of the Single Memory Plane to "0's" in combination with clock pulse CL–2*a* which energizes the single line Driver 21 before the actual writing operation of clock pulse CL–3 takes place.

The above explanation completes the description of a "write" operation for a Y access into the memory. As will be remembered with the Y access a plurality of X drive lines and a single Y drive line will be energized. In the case of an X access, a single X drive line and a plurality of Y drive lines must be energized. This energization or access is accomplished by the AND circuits 126 and 128 as indicated on FIG. 3. The operation and control of these AND circuits is thought to be apparent from the logical schematic diagram. The major differences being that the multiple drive output from the Shifter for Drivers 24 is applied in the Y direction rather than the X direction and conversely, the single line output from the Encoder 23 is applied in the X direction rather than the Y direction.

Having completed the above described operation it will be appreciated that the Data Register 4 is loaded with the contents of the corresponding core planes which are stored in the horizontal direction as indicated. At this point the Data Register is ready to transfer the data contained therein to whatever utilization circuitry requires said data. As described previously, this data would be transferred out of the Data Register 4 over the cables 28 which as is apparent are organized in the word rather than the bit direction.

Having thus described the invention with respect to the disclosed embodiment, it will be appreciated that the present memory system offers a very versatile multiple word access memory especially adapted for use with multiprocessor computer systems. While the system was described utilizing only four individual Memory Planes thus providing four bit words, it will be readily apparent as stated previously that the same principles would apply for a memory having an unlimited number of individual Memory Planes and thus many bits per word. Also, concurrent access of many more than four words or four bits per plane would be possible in addition to much larger individual planes. In order to handle the larger number of accesses and the larger planes, it would, of course, be necessary to considerably extend the B, C, and D fields of the Memory Address Register and also extend the network of the two Shifters 24 and 32. However, all of these modifications and extensions would be obvious to a person skilled in the art in the light of the present disclosure.

It should also be noted that other types of memories could be utilized in practicing the present invention. For example, thin magnetic film memories, electronic memories utilizing electronic flip-flops, capacitor diode memories, etc., and in general all memories having read-write capabilities could be readily substituted for the core memory disclosed.

While the invention has been particularly shown and described with reference to a preferred embodiment thereof, it will be understood by those skilled in the art that various changes in form and details may be made therein without departing from the spirit and scope of the invention.

What is claimed is:

1. A multiple word access memory for simultaneously accessing a plurality of multi-bit words stored in different addressable portions of said memory, said memory being composed of a plurality of separate storage sections, there being as many storage sections as bits in a memory word, control means for each section of memory for selectively reading and writing a plurality of bit positions in each section, said control means for each section being operable in parallel for selecting the same relative bit positions in each section under control of the memory system address register, sense means for individually sensing interrogated bit positions in each said section, and output register means for storing the results of a given memory access whereby individual data words stored in memory are accessed in their original configuration.

2. A multiple word access memory system as set forth in claim 1 wherein said multi-word access may occur along either of two orthogonal axes within said memory including:

means within each said control means operable in cooperation with the system memory address register for specifying the axis along which a particular memory access is to occur.

3. A multiple word access memory system as set forth in claim 2, each said control means including:

means cooperative with the system memory address register for specifying the beginning address of said multi-word access within the memory and along the specified axis, and means for consecutively accessing memory storage locations beginning with said beginning address.

4. A multiple word access memory as set forth in claim 3, each said control means including:

means cooperative with said system memory address register for specifying the number of consecutive words to be accessed in said memory wherein said number is specified in the overall memory address provided to the system memory address register, decoder means connected to said memory address register to determine the actual number of word locations to be accessed, and means for conveying said determination to the control means for each said memory section.

5. A multiple word access memory as set forth in claim 3 wherein the maximum number of words to be accessed from the memory in any particular access cycle is less than the number of words stored along either axis of said system, wherein there are only as many drivers, sense amplifiers, and output register storage locations associated with each section of memory as is required by the maximum number of words which is simultaneously accessible by the system, each said control means including:

shifting networks for each of the driving circuitry and sense circuity for each section of the memory system operable under control of the memory address word stored in the system memory address register which shifting networks are operable to provide drive pulses on the specified drive lines of said memory and for gating signals appearing on the sense lines into the specified storage register positions.

6. A multiple word access memory as set forth in claim 1 wherein said memory is a three dimensional magnetic core memory and wherein each section comprises:

an individual two dimensional core plane, all of the bits of a particular memory word being stored at the same relative address in consecutive core planes wherein each said core plane has an orthogonal X and a Y dimension and there are two half-select drive lines and two sense lines traversing each individual core of each plane.

7. A multiple word access memory as set forth in claim 6 wherein each core plane is capable of multiple contiguous bit access as in either the said X or Y directions, and means for interrogating the X or Y sense lines depending on the direction of memory access.

8. A multiple word access memory as set forth in claim 7 including:

means for passing half-select drive pulses through desired drive windings in a first direction to effect a read access and in the opposite direction to effect a write access.

9. A multiple word access memory as set forth in claim 8 wherein a memory access instruction supplied to the system memory address register contains four fields, a first field specifying the direction of the multiple access, a second field specifying the first address along the specified direction at which the access is to occur, a third field specifying how many consecutive words are to be accessed and a fourth field specifying along which line in said direction specified in said first field the access is to occur, each said control means including:

means responsive to the contents of said first field to cause said access to occur in the X or Y direction, means responsive to the contents of the second and third fields to connect the memory drivers and the sense amplifiers to the specified drive lines and sense lines respectively whereby half-select pulses may be applied to said selected drive lines and the specified sense lines may be connected to the sense amplifiers, and means responsive to the contents of said fourth field to cause a single driver to apply a half-select pulse to a drive line orthogonal to those selected in accordance with the contents of said second and third fields.

10. A multiple word access memory as set forth in claim 9 including:

means to disconnect the sense amplifiers from the output register means during "write" operations.

11. A multiple word access memory as set forth in claim 9 including:

means to connect the memory drivers to the drive lines in a first configuration during a reading cycle and in a second configuration during a writing cycle.

12. A multiple word access memory as set forth in claim 9 wherein said means responsive to said second and third fields comprises:

two shifting networks, each responsive to said second and third fields which select the proper drive lines into the memory over which the drive pulses are to be transmitted and connect the sense lines from selected storage cores to the appropriate storage positions of the output register.

13. A multiple word access memory as set forth in claim 12 including:

a system clock, and means for combining the output control pulses from said system clock with a "read" or "write" instruction to effect a specified memory access.

14. A multiple word access memory as set forth in claim 13 including:

means for staggering the clock pulses which effect the application of the half-select drive pulses to a specific storage location to allow the transient pulse generated in the sense lines due to the first half-select pulse to substantially disappear before application of a second half-select pulse.

References Cited

UNITED STATES PATENTS

| | | | |
|---|---|---|---|
| 2,872,666 | 2/1959 | Greenhalgh | 340—172.5 |

| | | | |
|---|---|---|---|
| 3,108,256 | 10/1963 | Buchholz et al. | 340—172.5 |
| 3,277,449 | 10/1966 | Shooman | 340—172.5 |
| 3,293,615 | 12/1966 | Mullery et al. | 340—172.5 |

PAUL J. HENON, *Primary Examiner.*